US 6,616,041 B1

(12) United States Patent
Corby, Jr.

(10) Patent No.: US 6,616,041 B1
(45) Date of Patent: Sep. 9, 2003

(54) PART MARKING METHOD APPLICABLE TO INDUSTRIAL PARTS

(75) Inventor: Nelson Raymond Corby, Jr., Scotia, NY (US)

(73) Assignee: General Electric Company, Niskayuna, NY (US)

(*) Notice: Subject to any disclaimer, the term of this patent is extended or adjusted under 35 U.S.C. 154(b) by 0 days.

(21) Appl. No.: 09/514,941

(22) Filed: Feb. 28, 2000

(51) Int. Cl.⁷ ................................................ G06K 7/10
(52) U.S. Cl. ................................. 235/462.01; 235/494
(58) Field of Search ........................ 235/494, 462.01, 235/449, 493; 360/369

(56) References Cited

U.S. PATENT DOCUMENTS

| | | | |
|---|---|---|---|
| 3,676,644 A | | 7/1972 | Vaccaro et al. |
| 4,166,574 A | * | 9/1979 | Yokoyama .................. 235/375 |
| 4,707,612 A | | 11/1987 | Martin |
| 4,979,159 A | * | 12/1990 | Tsuruoka et al. ........... 235/454 |
| 4,989,154 A | | 1/1991 | Yamashita et al. |
| 5,153,928 A | | 10/1992 | Iizuka |
| 5,391,994 A | | 2/1995 | Baillie et al. |
| 5,489,768 A | * | 2/1996 | Brownstein et al. ... 235/462.01 |
| 5,519,200 A | | 5/1996 | Williams |
| 5,539,203 A | * | 7/1996 | Ohdomari ................... 250/309 |
| 5,742,036 A | * | 4/1998 | Schramm et al. .......... 235/449 |
| 6,003,763 A | * | 12/1999 | Gallagher et al. .......... 235/379 |
| 6,115,340 A | * | 9/2000 | Van Den Enden et al. ...... 369/275.3 |
| 6,176,434 B1 | * | 1/2001 | Baldur ....................... 235/494 |
| 6,280,891 B2 | * | 8/2001 | Daniel et al. ................. 283/86 |
| 6,291,794 B1 | * | 9/2001 | Dulaney ................ 219/121.61 |
| 6,333,488 B1 | * | 12/2001 | Lawrence et al. ..... 219/121.84 |

FOREIGN PATENT DOCUMENTS

| | | |
|---|---|---|
| DE | 19753248 | 10/1999 |
| EP | 0971304 | 12/2000 |
| WO | 9616376 | 5/1996 |

OTHER PUBLICATIONS

Enclosed is a copy of the European Search Report, EP 1 130 530 A3, Place of Search The Hague, Date of completed search Feb. 15, 2002, Examiner M. Schauler, p. 2.

* cited by examiner

Primary Examiner—Thien M. Le
Assistant Examiner—Lisa M. Caputo
(74) Attorney, Agent, or Firm—Penny A. Clarke; Partrick K. Patnode

(57) ABSTRACT

A durable part marking is achieved by local surface material modification. Selected surface area properties of the part are altered without substantial alteration of the physical configuration of the part. The alterations are placed in a coherent pattern accomplishing a durable method of identification marking on a part. Subsequently, the coherent pattern is detected and the coherent pattern interpreted to retrieve the original identification marking. Unlike labeling, ink marking, stamping or etching, many surface or near-surface modifications are not necessarily visible to the human eye. Hence, the invention includes: 1) a method for surface modification, 2) a method for assuring enhanced readability and accuracy of the read back of the encoded data, and 3) a method for locating the surface alteration.

20 Claims, 2 Drawing Sheets

PART MARKING METHOD APPLICABLE TO INDUSTRIAL PARTS

BACKGROUND OF THE INVENTION

The present invention relates to the marking of industrial parts. In particular, the invention relates to permanent marking of parts used in hostile environments and where physical alteration of the part to create the mark can be detrimental.

In many industries, it is necessary to identify and track the individual component parts of a machine or device. For example, in the manufacture of aircraft engines or gas turbines, the individual airfoils comprising the turbine must be tracked during the life of the engine or turbine. Part marking allows a manufacturer to track parts during the component's life cycle. Thereby, long-term data is collected for reliability modeling, future design improvements, and contract compliance. The markings on a part can be adversely affected by the severe environments within the turbine hot gas path and by the cleaning/repair operations encountered during periodic maintenance operations.

Ideally, such markings are permanent, able to withstand usage (e.g., surface abrasion), able to withstand thermal cycling, able to withstand harsh environments during use and servicing, and, most importantly, have no impact on the function and lifespan of the part. Certain parts additionally require that their mechanical design not be compromised by the creation of markings upon the surface of the finished part. The removal/displacement of a part's material can affect the function of a system (weight distribution and balance can be affected) or can endanger the part itself (stamped lettering can act as an initiation site for stress cracking).

Part marks can be of two types: human readable and non-human readable. An example of the first is a string of letters and numbers written in a particular size and font. An example of the latter is a supermarket barcode.

A number of part identification approaches have been tried with varying degrees of success in durability and readability. Inks and paints have been used to identify parts with bar-coding or simple character information. Such markings may be referred to as two-dimensional (2D) in that they substantially only affect two dimensions of the surface of the part. These methods are insufficiently permanent under the thermal environments typically encountered in aviation or power generation. Labels applied to the part surface wear off or burn off and are unsuitable for parts where the surface area is uneven or lacking sufficient area to be readable. Metallic labels are hazardous when dislodged, difficult to remark in the field, and weighty by comparison to other marking types.

In order to track a part over its lifetime, the markings must be read and input into a computer system at every point of handling. Recognition accuracy often must exceed 99.99% in order for reliable life data to be accumulated. Humans cannot usually reach these levels for any significant amount of time. Machine systems which read the part markings and directly input the data into the computer system must be applied to approach the reliability required.

For the forgoing reasons, there is a need for an apparatus and simple system of part marking that is easily readable in the field yet requires no modifications to the surface of the part such as cutting, etching, abrading, laser or other form of removal of material.

BRIEF SUMMARY OF THE INVENTION

The invention disclosed herein consists of a system of modifying the physical properties of the materials comprising the surface of the part or a subsurface zone extending some depth into the material at specific localized sites using physical means that do not affect the strength related or 3D characteristics of the part material and do not rely upon painted or other 2D marking being applied to the part surface.

BRIEF DESCRIPTION OF THE DRAWINGS

A better understanding of the features and advantages of the present invention will become better understood with regard to the following detailed description, appended claims, and the accompanying drawings where:

DETAILED DESCRIPTION OF THE INVENTION

Figure 1:
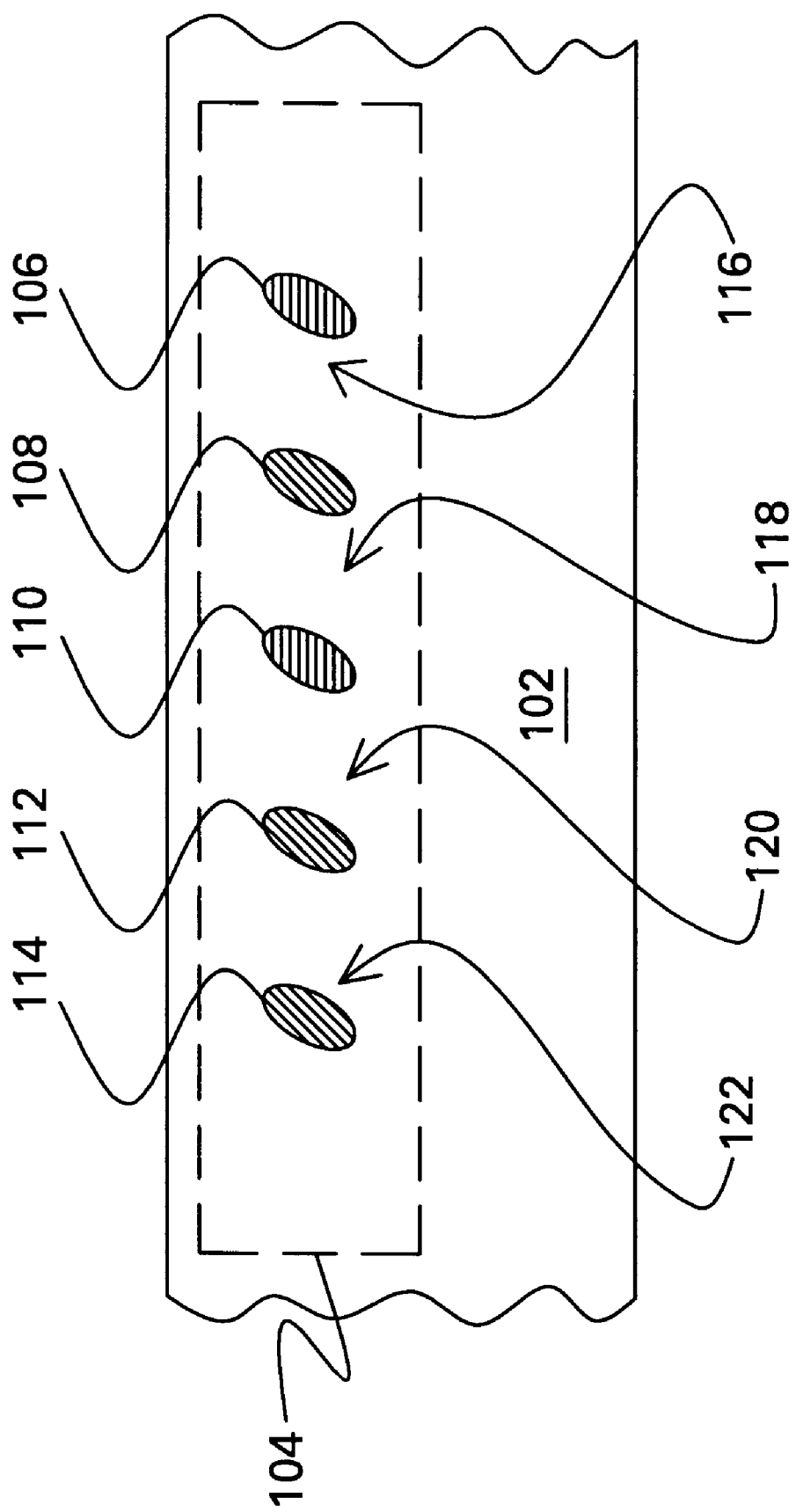
FIG. 1. shows a pictorial representation of a surface modification adding identification marking in a data track.

In the present invention a durable part marking is achieved by local surface material modification. Altering selected surface area properties of the part and placing these alterations in a coherent pattern accomplishes a method of identification marking on a part. Subsequently, the coherent pattern is detected and the coherent pattern interpreted to retrieve the original identification marking.

Unlike labeling, ink marking, stamping or etching, many surface or near-surface modifications are not necessarily visible to the human eye. Hence, the invention includes: 1) a method for surface modification, 2) a method for assuring enhanced readability and accuracy of the reading of the encoded data, and 3) a method for locating the surface alteration. Examples of the procedures for local surface modification include:

1. Shock hardening of the surface
2. Ion implantation
   a. Surface magnetism
   b. Electrical surface resistivity
3. Optical surface properties Shock Hardening: This method, also known as "laser shock peening," alters the surface compressive residual-stresses without changing the surface geometry to any significant degree. This is a mechanical process involving the bombardment of the surface by a localized pressure wave created by the intense pulse of laser light striking a film of water on the part surface, plastic deformation of the surface layers, and the production of a steep residual-stress field that is compressive at the surface. The slight density differential is detectable by ultrasound reflections. This is a simple and highly accurate method of surface modification.

Ion implantation: In this process, atoms of gaseous or metallic elements are ionized and pass to a high vacuum chamber where they are accelerated through a mass separator. Selected ions are then further accelerated and implanted into the target component. The implanted species occupy interstitial sites and distort the lattice. The depth of effect is very shallow, approximately 0.2 microns. Ion implantation systems utilize a focused ion beam (FIB) or micro ion beam (MIB) with a microprobe. This permits highly accurate implantation of a controlled number of ions into a target area with a high degree of aiming accuracy.

The implantation of iron ions changes the magnetic characteristics of the surface. This difference in iron ions is detectable by a magnetometer. A small superconducting loop of one or several Josephson junctions is known as a superconducting quantum interference device (SQUID) magnetometer capable of detecting slight variations in surface magnetism.

Surface Resistivity: The implantation of doping ions changes the resistance characteristics of the surface. The surface resistance is defined as the electrical resistance across the surface of an object measured between the opposite sides of a square on the surface, and is expressed in ohms per square area. In a publication entitled "Standard Test Methods for DC Resistance or Conductance of Insulating Materials," D257, pp 1–16, published by the American Society of Testing and Materials numerous test methods are proposed.

The resistivity difference caused by the dopant is also detectable by an eddy current measurement. In this instance a small multi-turn coil, typically 1/8 inch (2.88 mm) to 1/16 inch (1.44 mm) in diameter, is positioned a short distance above and parallel to a conductive metal material. A sinusoidal AC current is caused to flow through the coil. The AC magnetic field created by the coil is coupled into the metal and causes a circular current to flow (parallel to the surface) in the metal. This is the eddy current. The amount of eddy current flowing and the size/shape of the current will adjust itself so that the magnetic field created by the eddy current will be exactly equal and opposite to the applied field. There will be a phase lag between applied AC signal and the eddy AC signal sensed back at the original coil. The phase difference will vary depending on how the 3D conductivity of the non-ideal surface differs from what is expected from an ideal conductor. Scanning an area in this manner results in a "map" of the surface resistivity. The areas purposely altered by doping stand out clearly against the background of untreated surface area.

Polarization: The surface of the material may be polarized to place down markings and not alter the material. Reflecting a light off of the surface and detecting the reflection of coherent light from an incoherent source indicates a polarized surface. In this manner the surface can be "mapped" to recover the marking. implanted.

Other methods or treatments are possible. One such example is thermochemical diffusion treatments wherein elements including boron, nitrogen, or carbon are diffused at elevated temperatures into the interstitial regions of ferric materials. These modifications alter the material properties in a manner that, after marking, it is possible to detect that the affected zone has been processed.

The techniques can be employed directly to "draw" or "print" a sequence of alphanumeric characters or patterns on a surface in what shall be called the "data track." In order to enhance the accuracy and readability of the data encoded in the surface modification it is preferable to transform the string of alphanumeric characters comprising the part identification string into a sequence of digits drawn from a selected basis. A simple example is the 8-bit binary ASCII code digits. Binary representations are preferable since they have the highest signal-to-noise ratio when compared to other formulations. Although, base 3 and higher encoding is possible.

Thus, for a binary sequence "00101" the surface zone treatment pattern might be "00X0X" where "X" represents a small surface (or near surface) patch that has been "treated" using one of the above methods.

A pictorial of the identification marking of a part 102 is generally shown in FIG. 1. A data track 104 is made up of a plurality of possibly treated data track areas 106 through 114. Each of the possibly treated data track areas 106 through 114 is either treated by one of the methods or untreated. Two or more of the surface treatment methods may be used to enhance readability. For example, data track area 106 is shown treated by one method while data track area 108 is treated by another method in order to distinguish a binary encoding. Small intervals or spaces 116 through 122 separate adjacent possibly treated areas. The treated areas are be arranged serially along a straight line (ID) or a curve (2D or 3D) on a flat or curved surface or arranged in any surface appropriate 2D pattern (e.g., checkerboard patterns or radial arrangements).

The addition of a reference track to the data track provides an extended technique for enhancing accuracy of read back of the surface treatment data since it may be physically difficult to detect the presence or absence of surface treatment. For example, two tracks of data can be imposed on the surface as follows wherein "X" indicates a surface treated areas:

X X X X X (reference track)
0 0 X 0 X (data track)

Figure 2:
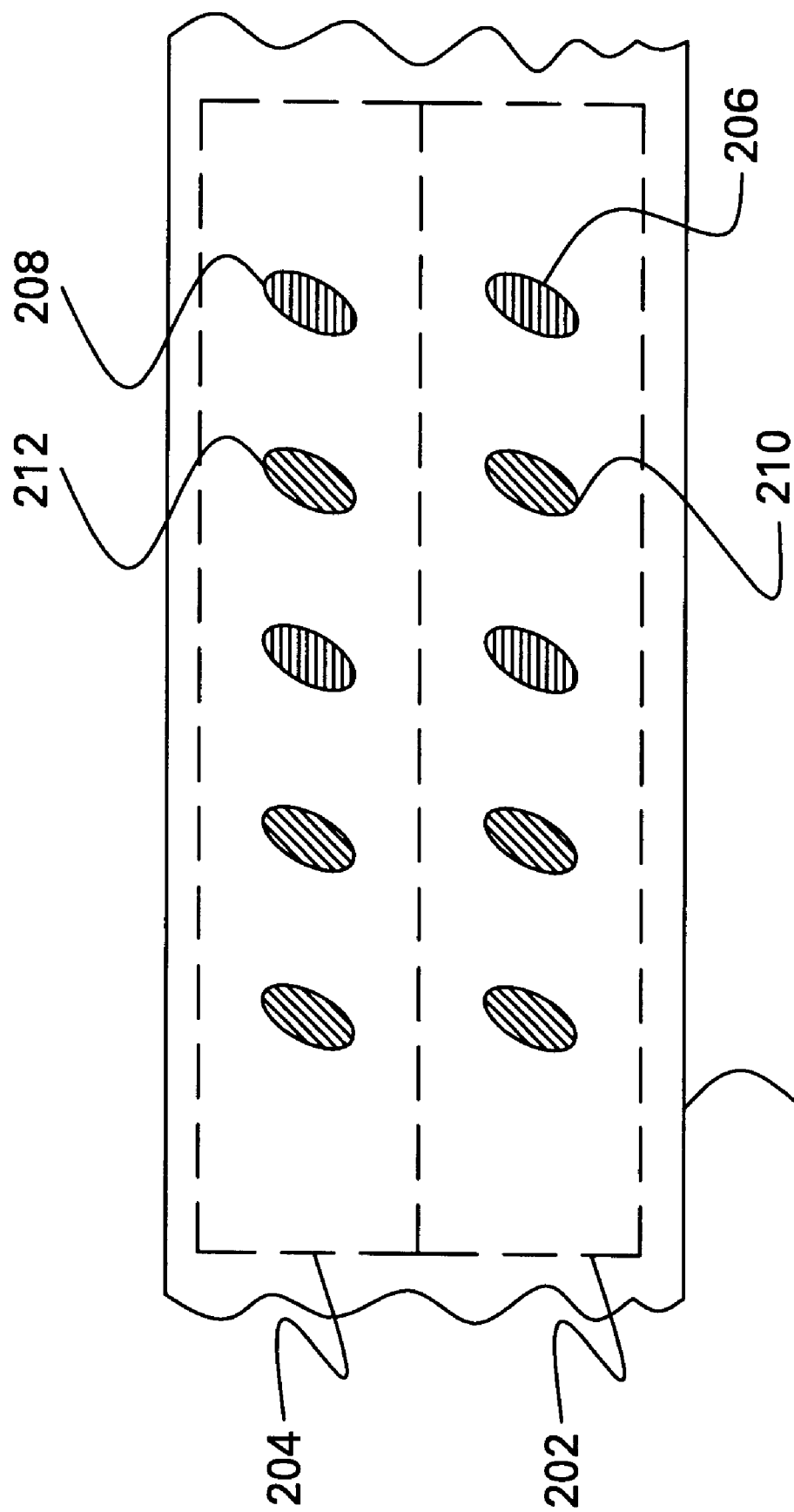
FIG. 2. shows a pictorial representation of a surface modification adding identification marking with enhanced readability.

A data track 202 and a reference track 204 is shown on a part 200 in FIG. 2. The reference track 204 allows for locating the data track 204 and providing a reference (treated) value for categorizing the sensed signal by comparison to the reference track. The reference track 204 allows for a convenient classification of the detected signal. In a binary system if a difference between the data track area and the reference track area exists then a "1" was written. If the responses of the two areas are similar then a "0" was written. For example, a data track area 206 is treated by one surface treatment method. A corresponding reference track area 208 is treated by different method or is untreated. These two areas will give different responses to the detection methods employed therefore a "1" was written. Conversely, a data track area 210 and a corresponding reference area 212 are both treated by the same method (or both untreated) so that both areas will provide the same response to any detection method employed. Therefore, a "0" was written.

If a single data track is used, methods to enhance read back accuracy exist to create coded sequences that are "self-clocking." That is, state transitions are guaranteed to exist at each digit location and by keeping track of "1" to "0" and "0" to "1" transitions the original pattern can be recovered. One example is a Winchester code used on magnetic disk drives and tapes. Many of the techniques developed for magnetic storage media could be used to advantage.

Another feature of this invention is usage of error detecting and correcting codes to allow for the possible destruction of a portion of the marking over time as the part is used and serviced. Rather than writing just the base set of information digits, one can append an additional set of specially designed check digits. By careful design, the new encoded bit string can suffer the progressive garbling or destruction of arbitrarily many individual string digits while still allowing recovery of the information digits. Typical Hamming codes and other error correcting codes have long been known. The fundamentals of error detecting and correcting are described by R. W. Hamming in a technical article titled "Error detecting and error correcting codes" appearing in the Bell System Technical Journal, Volume 26, No. 2, 1950 at pages 147–160. This approach can be used in base 2 and higher alphabets.

Since, the "implanted" markings will probably not be directly observable to an operator without additional apparatus, the identification system also provides a small handheld (or perhaps bench top) scanning box that the part is pressed against and read. The detected string of encoded digits is decoded and displayed on a multi-character optical display for the operator in human readable form and/or connected to a computer tracking system to maintain a database on the part or to route it through the servicing steps.

A number of methods exist to allow localization and detection of the patterned area on the part surface. One procedure is a physical template to apply the reading head. This amounts to marking at agreed locations and then reading at those locations. A predesigned holding fixture suffices. Another localization process detects the encoded areas by scanning the surface of the part to localize a previously "implanted" location pattern (such as a bounding box, for example) and then scanning proceeds at agreed upon locations relative to the localization pattern boundaries.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. A method of identification marking for an airfoil comprising a material, said method comprising:

altering at least one property of the material at a plurality of selected areas on the surface of the airfoil to form a coherent pattern of material property alterations on a data track; and forming a coherent pattern of reference material property alterations on a reference track, the reference track providing a calibration to aid in detection of the coherent pattern of material property alterations on the data track, wherein an identification marking for the airfoil comprises the coherent pattern of material property alterations.

2. The method of claim 1, wherein the coherent pattern further comprises an error detecting code.

3. A method of identification marking for a part comprising a material, said method comprising altering at least one property of the material at a plurality of selected areas on the surface of the part to form a coherent pattern of material property alterations on a data track, wherein an identification marking for the part comprises the coherent pattern of material property alterations, wherein said alteration comprises laser shock peening the selected areas on the surface of the part to form the coherent pattern of material property alterations on the data track.

4. The method of claim 3, wherein said alteration further comprises forming a coherent pattern of reference material property alterations on a reference track, the reference track providing a calibration to aid in detection of the coherent pattern of material property alterations on the data track.

5. The method of claim 3, wherein the coherent pattern further comprises an error detecting code.

6. The method of claim 5, wherein said alteration further comprises forming a coherent pattern of reference material property alterations on a reference track, the reference track providing a calibration to aid in detection of the coherent pattern of material property alterations on the data track.

7. A method of identification marking for a part comprising a material, said method comprising:

altering at least one property of the material at a plurality of selected areas on the surface of the part to form a coherent pattern of material property alterations on a data track, wherein an identification marking for the part comprises the coherent pattern of material property alterations; and forming a coherent pattern of reference material property alterations on a reference track, the reference track providing a calibration to aid in detection of the coherent pattern of material property alterations on the data track, wherein said alteration comprises ion implanting the selected areas on the surface of the part to form the coherent pattern of material property alterations on the data track.

8. The method of claim 7, wherein the coherent pattern further comprises an error detecting code.

9. The method of claim 7, wherein said ion implantation comprises doping the selected areas on the surface of the part to form the coherent pattern of material property alterations on the data track.

10. The method of claim 9, wherein the coherent pattern further comprises an error detecting code.

11. The method of claim 7, wherein said ion implantation comprises adding magnetic ions to the selected areas on the surface of the part to form the coherent pattern of material property alterations on the data track.

12. The method of claim 11, wherein the coherent pattern further comprises an error detecting code.

13. A method of identification marking for a part comprising a material, said method comprising:

altering at least one property of the material at a plurality of selected areas on the surface of the part to form a coherent pattern of material property alterations on a data track, wherein an identification marking for the part comprises the coherent pattern of material property alterations; and forming a coherent pattern of reference material property alterations on a reference track, the reference track providing a calibration to aid in detection of the coherent pattern of material property alterations on the data track, wherein said alteration comprises polarizing the material within the selected areas on the surface of the part to form the coherent pattern of material property alterations on the data track.

14. The method of claim 13, wherein the coherent pattern further comprises an error detecting code.

15. A method of identifying a part comprising a material, said method comprising:

detecting at least one coherent pattern comprising a plurality of surface alterations of the material, each of the surface alterations comprising an area on the surface of the part having at least one property of the material therein being altered; and interpreting the coherent pattern of surface alterations as a marking, wherein:

each of the surface alterations is formed by laser shock peening the respective area on the surface of the part; and said detecting comprises measuring at least one ultrasonic reflection from the coherent pattern of surface alterations of the material.

16. The method of claim 15, wherein said interpreting comprises providing a human-readable output.

17. The method of claim 15, wherein said detecting further comprises creating a template to aid in locating the coherent pattern of surface alterations.

18. The method of claim 17, wherein said interpreting comprises providing a machine-readable output.

19. The method of claim 15, wherein said detecting comprises:

scanning the surface of the part to detect at least one boundary of the coherent pattern of surface alterations;

localizing the coherent pattern of surface alterations within the at least one boundary; and scanning the coherent pattern of surface alterations within the at least one boundary.

20. The method of claim 19, wherein said interpreting comprises providing a machine-readable output.

* * * * *